United States Patent
Khoshnevisan et al.

(10) Patent No.: US 11,102,676 B2
(45) Date of Patent: Aug. 24, 2021

(54) TECHNIQUES FOR USING DOWNLINK CONTROL INFORMATION IN NEW RADIO

(71) Applicant: QUALCOMM Incorporated, San Diego, CA (US)

(72) Inventors: Mostafa Khoshnevisan, San Diego, CA (US); Mehmet Yavuz, San Diego, CA (US); Rajat Prakash, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/279,503

(22) Filed: Feb. 19, 2019

(65) Prior Publication Data

US 2019/0261218 A1 Aug. 22, 2019

Related U.S. Application Data

(60) Provisional application No. 62/632,687, filed on Feb. 20, 2018.

(51) Int. Cl.
*H04W 72/04* (2009.01)
*H04W 28/06* (2009.01)
(Continued)

(52) U.S. Cl.
CPC ........... *H04W 28/06* (2013.01); *H04L 1/0003* (2013.01); *H04L 1/0006* (2013.01);
(Continued)

(58) Field of Classification Search
CPC ..... H04L 1/0003; H04L 1/0009; H04L 27/34; H04W 28/06
See application file for complete search history.

(56) References Cited

U.S. PATENT DOCUMENTS

| 2011/0223924 A1* | 9/2011 | Lohr | H04W 72/042 455/450 |
| 2013/0155990 A1* | 6/2013 | Nishio | H04W 72/042 370/329 |

(Continued)

OTHER PUBLICATIONS

Ericsson: "Techniques for downlink control in URLCC," 3GPP Draft; R1-1802878—Techniques for Downlink Control in URLLC, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 16, 2018, XP051397363, 10 pages, Retrieved from the Internet: URL: http://www.3gpp.org/ftp/tsg%5Fran/WG1%5FRL1/TSGR1%5F92/Docs/ [retrieved on Feb. 16, 2018] sections 2.3, 2.4.

(Continued)

*Primary Examiner* — Fahmida S Chowdhury
(74) *Attorney, Agent, or Firm* — QUALCOMM Incorporated

(57) ABSTRACT

Various aspects described herein relate to techniques for managing downlink control information (DCI) in wireless communications (e.g., 5G NR). In an aspect, the method includes receiving a radio resource control (RRC) message, identifying a transport block size (TBS) based on the received RRC message, receiving DCI on a downlink channel with the DCI including a resource assignment, identifying a modulation order using a modulation and coding scheme (MCS) in an MCS field of the DCI, where the size of the MCS field is one bit or two bits, and calculating a coding rate based on at least the identified TBS, the identified modulation order and the resource assignment.

30 Claims, 7 Drawing Sheets

(51) Int. Cl.
  *H04L 27/34* (2006.01)
  *H04L 1/00* (2006.01)
  *H04W 76/27* (2018.01)

(52) U.S. Cl.
  CPC .......... *H04L 1/0009* (2013.01); *H04L 27/34* (2013.01); *H04W 72/042* (2013.01); *H04W 76/27* (2018.02)

(56) References Cited

U.S. PATENT DOCUMENTS

| | | | | |
|---|---|---|---|---|
| 2015/0195069 | A1* | 7/2015 | Yi | H04W 76/27 370/329 |
| 2015/0365181 | A1* | 12/2015 | Nagata | H04L 1/00 370/329 |
| 2017/0005846 | A1* | 1/2017 | Mohamed | H04L 1/00 |
| 2017/0181136 | A1* | 6/2017 | Bharadwaj | H04W 84/12 |
| 2018/0160401 | A1* | 6/2018 | Goto | H04L 5/04 |
| 2018/0220443 | A1* | 8/2018 | Kim | H04W 74/06 |
| 2019/0082496 | A1* | 3/2019 | Yi | H04W 68/02 |
| 2019/0364585 | A1* | 11/2019 | Lee | H04W 72/12 |

OTHER PUBLICATIONS

Intel Corporation: "On Compact DCI Format for NR URLLC," 3GPP Draft; R1-1802422 Intel—PDCCH_DCIPAYLOAD, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018—Mar. 2, 2018, Feb. 17, 2018, XP051397947, 6 pages, Retrieved from the Internet: URL: http://www.3gpp.org/ftp/tsg%5Fran/WG1%5FRL1/TSGR1%5F92/Docs/ [retrieved on Feb. 17, 2018] section 3.

International Search Report and Written Opinion—PCT/US2019/018775—ISA/EPO—dated May 24, 2019.

Nokia et al: "Remaining Details of CQI and MCS for URLLC," 3GPP Draft; R1-1802546_URLLC_MCS_CQI_Final, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26. 2018-Mar. 2, 2018, Feb. 17, 2018, XP051398008, 7 Pages, Retrieved from the Internet: URL: http://www.3gpp.org/ftp/tsg%5Fran/WG1%5FRL1/TSGR1%5F92/Docs/ [retrieved on Feb. 17, 2018].

Frotzscher A., et al., "Requirements and Current Solutions of Wireless Communication in Industrial Automation", ICC'14-W8: Workshop on 5G Technologies, IEEE, 2014, pp. 67-72.

* cited by examiner

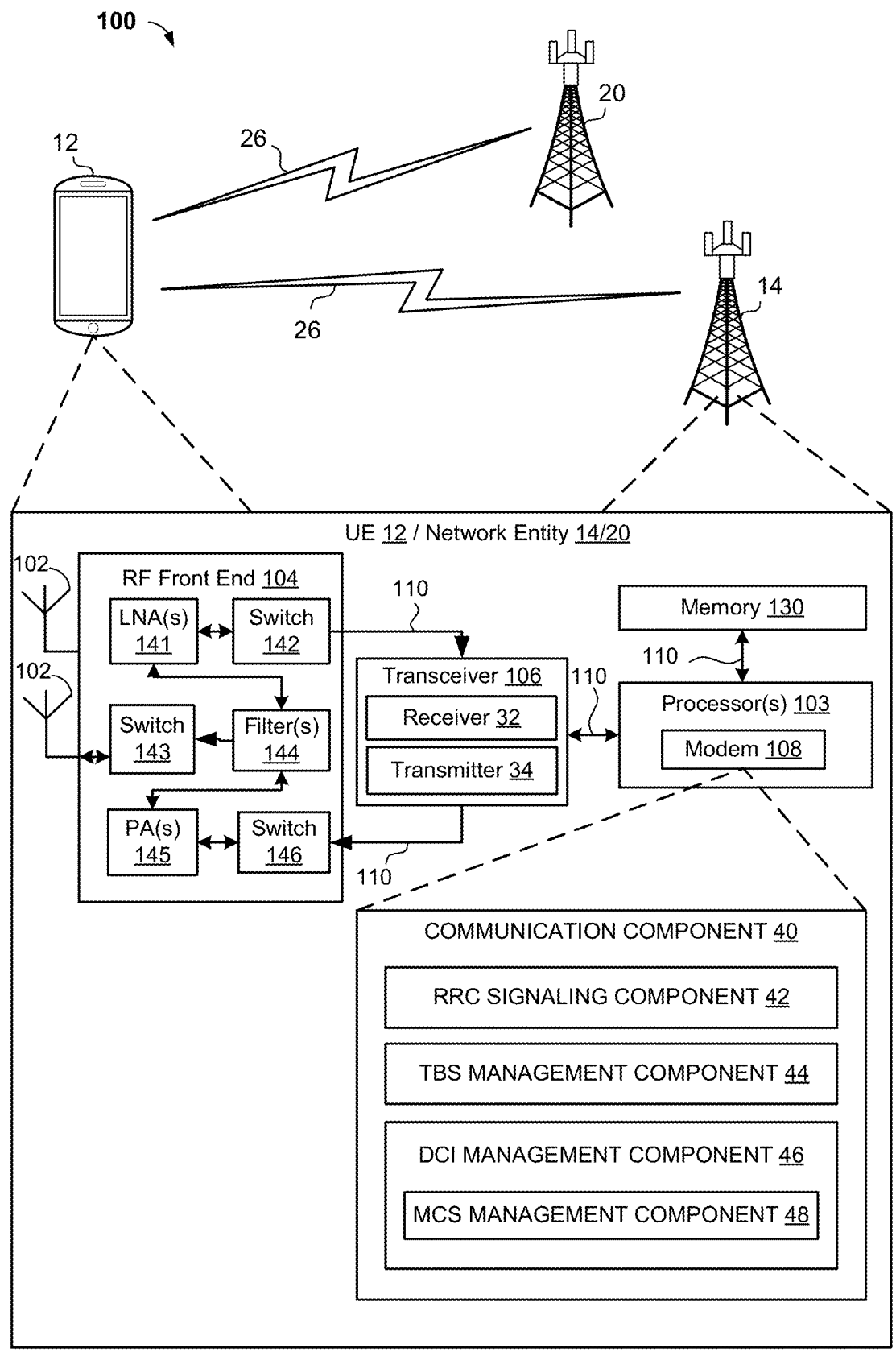
FIG. 1

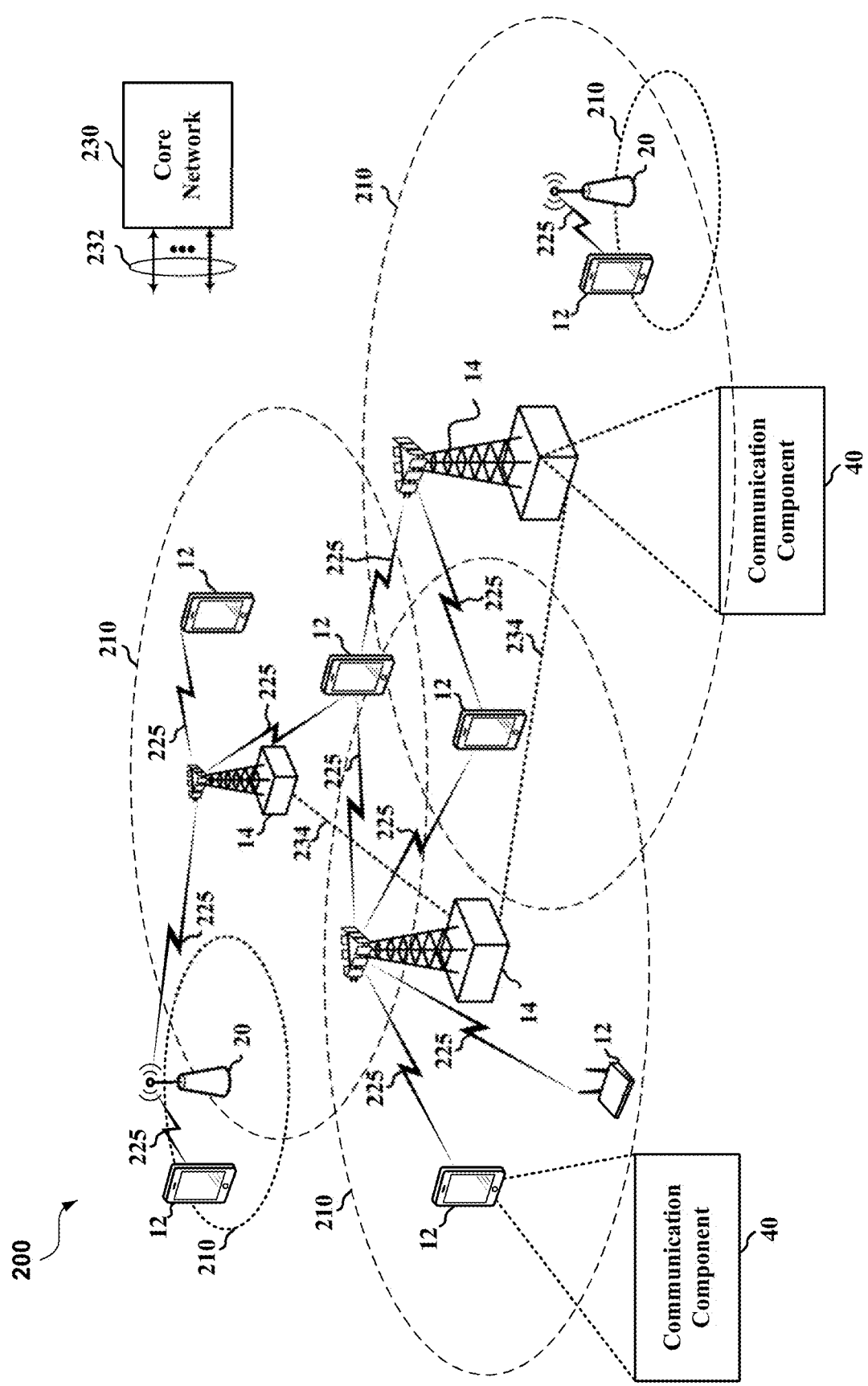
FIG. 2

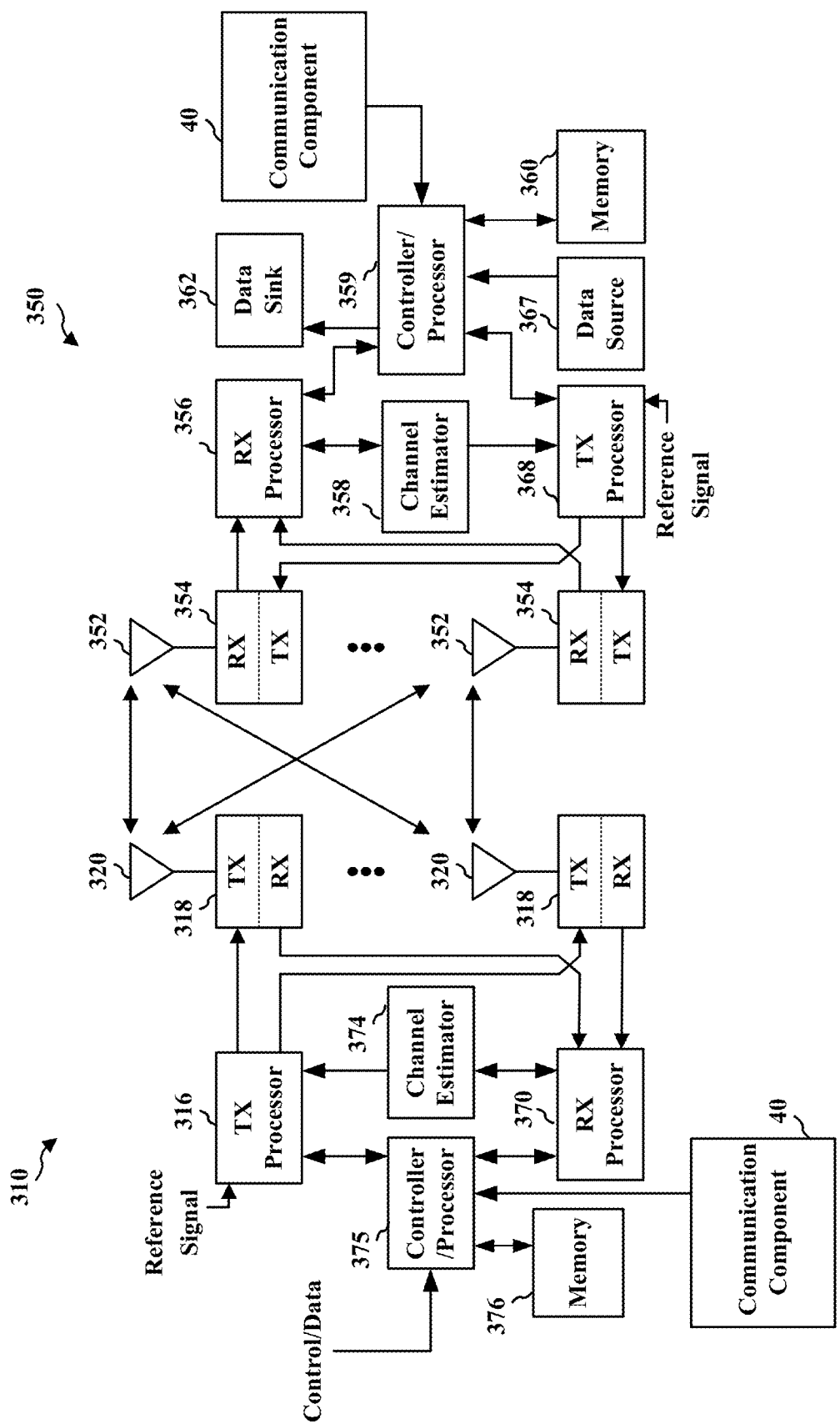
FIG. 3

Table 400

| MCS Index | Modulation | CodeRate | Efficiency |
|---|---|---|---|
| 0 | QPSK | 0.1172 | 0.2344 |
| 1 | QPSK | 0.1533 | 0.3066 |
| 2 | QPSK | 0.1885 | 0.3770 |
| 3 | QPSK | 0.2451 | 0.4902 |
| 4 | QPSK | 0.3008 | 0.6016 |
| 5 | QPSK | 0.3701 | 0.7402 |
| 6 | QPSK | 0.4385 | 0.8770 |
| 7 | QPSK | 0.5137 | 1.0273 |
| 8 | QPSK | 0.5879 | 1.1758 |
| 9 | QPSK | 0.6631 | 1.3262 |
| 10 | 16QAM | 0.3320 | 1.3281 |
| 11 | 16QAM | 0.3691 | 1.4766 |
| 12 | 16QAM | 0.4238 | 1.6953 |
| 13 | 16QAM | 0.4785 | 1.9141 |
| 14 | 16QAM | 0.5400 | 2.1602 |
| 16 | 16QAM | 0.6426 | 2.5703 |
| 17 | 64QAM | 0.4277 | 2.5664 |
| 18 | 64QAM | 0.4551 | 2.7305 |
| 19 | 64QAM | 0.5049 | 3.0293 |
| 20 | 64QAM | 0.5537 | 3.3223 |
| 21 | 64QAM | 0.6016 | 3.6094 |
| 22 | 64QAM | 0.6504 | 3.9023 |
| 23 | 64QAM | 0.7021 | 4.2129 |
| 24 | 64QAM | 0.7539 | 4.5234 |
| 25 | 64QAM | 0.8027 | 4.8164 |
| 26 | 64QAM | 0.8525 | 5.1152 |
| 27 | 64QAM | 0.8887 | 5.3320 |
| 28 | 64QAM | 0.9258 | 5.5547 |
| 29 | QPSK | reserved | |
| 30 | 16QAM | | |
| 31 | 64QAM | | |

FIG. 4

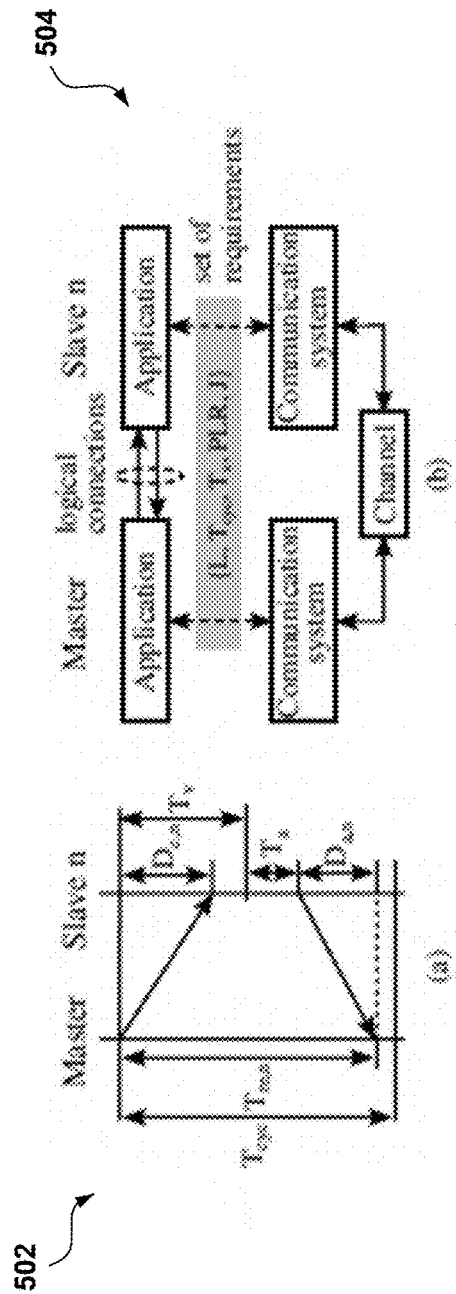
Prior Art
FIG. 5A
Prior Art
FIG. 5B
Table 506

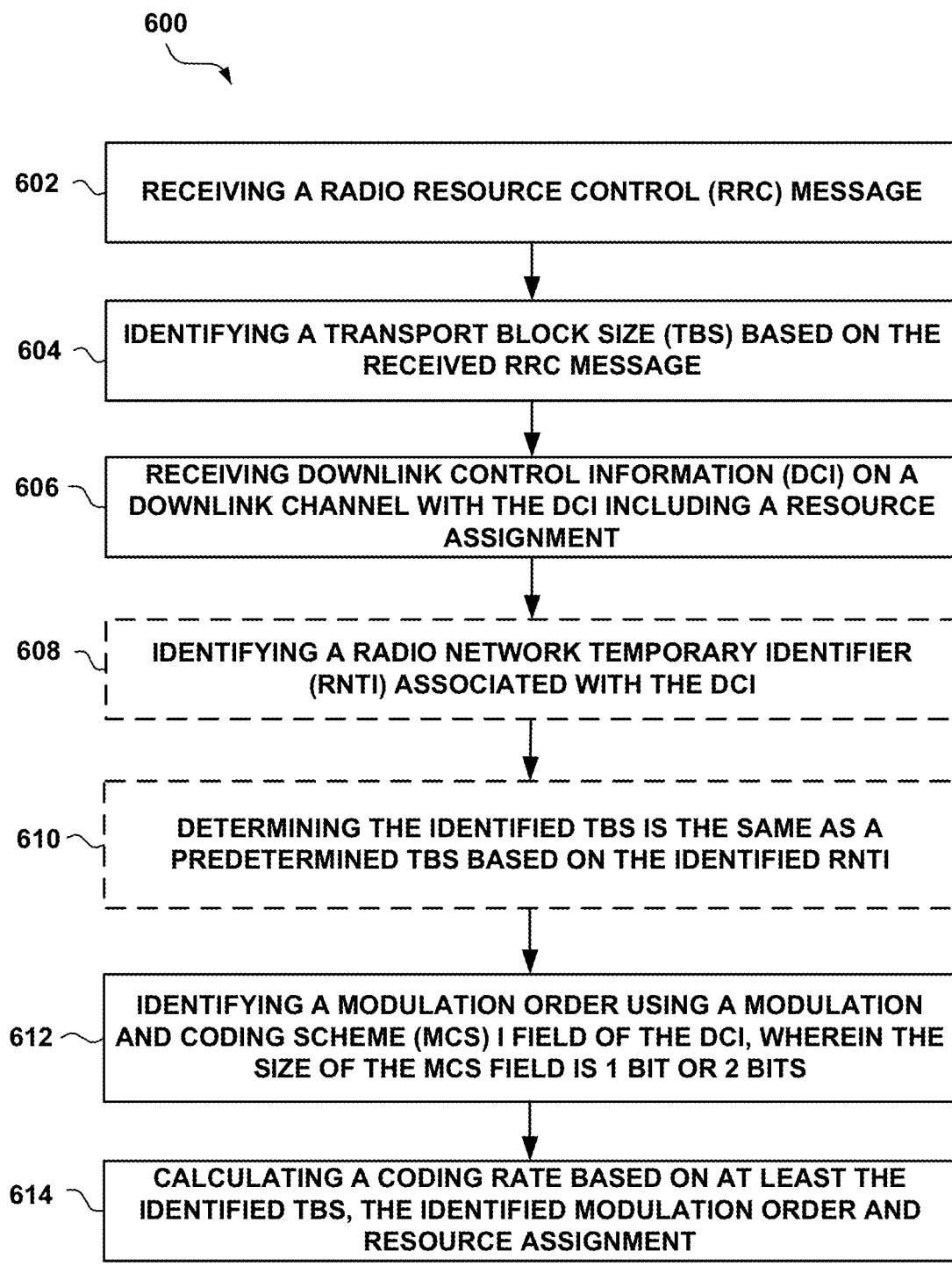
FIG. 6

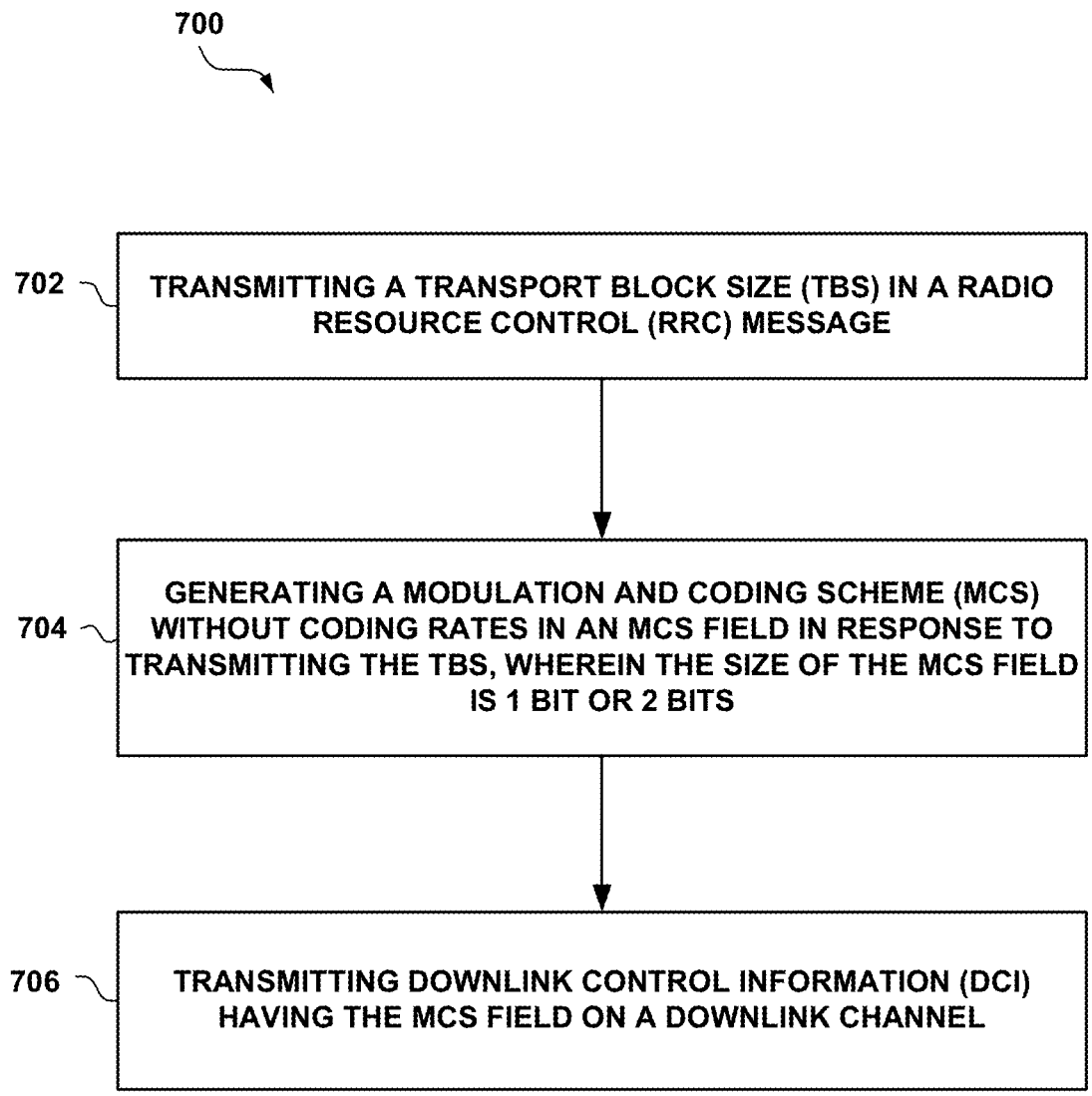
FIG. 7

TECHNIQUES FOR USING DOWNLINK CONTROL INFORMATION IN NEW RADIO

CROSS-REFERENCE TO RELATED APPLICATION

This application claims the benefit of U.S. Provisional Application Ser. No. 62/632,687, entitled "TECHNIQUES FOR USING DOWNLINK CONTROL INFORMATION IN NEW RADIO" and filed on Feb. 20, 2018, which is expressly incorporated by reference in its entirety.

BACKGROUND

Aspects of the present disclosure relate generally to wireless communications systems, and more particularly, to techniques for using modulation and coding schemes (MCS) in downlink control information (DCI) for wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is the 4th Generation (4G) communications technology, for example, Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine-type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for higher data rates, lower latency, and higher system reliability, new approaches or techniques may be desirable to improve physical layer procedures and modulation and coding schemes, for example, using downlink control information (DCI) having a reduced MCS field, in order to enhance or increase system capacity and spectral efficiency, to satisfy consumer demand, and to improve user experience in wireless communications, e.g., 5G NR.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method related to managing downlink control information (DCI) by a user equipment (UE) for wireless communications is provided. In an aspect, the method includes receiving a radio resource control (RRC) message, identifying a transport block size (TBS) based on the received RRC message, receiving DCI on a downlink channel with the DCI including a resource assignment, identifying a modulation order using a modulation and coding scheme (MCS) in an MCS field of the DCI (where the size of the MCS field may be one bit or two bits), and calculating a coding rate based on at least the identified TBS, the identified modulation order and the resource assignment.

In another example, a user equipment (UE) for managing downlink control information (DCI) for wireless communications is disclosed. The UE may include a transceiver, a memory storing instructions and one or more processors coupled with the transceiver and memory. The one or more processors are configured to receive a radio resource control (RRC) message, identify a transport block size (TBS) based on the received RRC message, receive DCI on a downlink channel with the DCI including a resource assignment, identify a modulation order using a modulation and coding scheme (MCS) in an MCS field of the DCI (where the size of the MCS field may be one bit or two bits), and calculate a coding rate based on at least the identified TBS, the identified modulation order and the resource assignment.

In another example, a user equipment (UE) for managing downlink control information (DCI) for wireless communications is disclosed. The UE may include means to receive a radio resource control (RRC) message, means to identify a transport block size (TBS) based on the received RRC message, means to receive DCI on a downlink channel with the DCI including a resource assignment, means to identify a modulation order using a modulation and coding scheme (MCS) in an MCS field of the DCI (where the size of the MCS field may be one bit or two bits), and means to calculate a coding rate based on at least the identified TBS, the identified modulation order and the resource assignment.

In another example, a non-transitory computer-readable medium for managing downlink control information (DCI) by a user equipment (UE) for wireless communications is disclosed. The non-transitory computer-readable medium includes codes executable by one or more processors to receive a radio resource control (RRC) message, identify a transport block size (TBS) based on the received RRC message, receive DCI on a downlink channel with the DCI including a resource assignment, identify a modulation order using a modulation and coding scheme (MCS) in an MCS field of the DCI (where the size of the MCS field may be one bit or two bits), and calculate a coding rate based on at least the identified TBS, the identified modulation order and the resource assignment.

In another example, a method related to managing downlink control information (DCI) by a base station for wireless communications is provided. In an aspect, the method includes transmitting a transport block size (TBS) in a radio resource control (RRC) message, generating a modulation and coding scheme (MCS) without coding rates in an MCS field in response to transmitting the TBS (where the size of the MCS field is one bit or two bits), and transmitting the DCI having the MCS field on a downlink channel.

In another example, a base station for managing downlink control information (DCI) for wireless communications is disclosed. The base station may include a transceiver, a memory storing instructions and one or more processors coupled with the transceiver and memory. The one or more processors are configured to transmit a transport block size (TBS) based in a radio resource control (RRC) message, generate a modulation and coding scheme (MCS) without coding rates in an MCS field in response to transmitting the TBS (where the size of the MCS field is one bit or two bits), and transmit the DCI having the MCS field on a downlink channel.

In another example, a base station for managing downlink control information (DCI) for wireless communications is disclosed. The base station may include means to transmit a transport block size (TBS) based in a radio resource control (RRC) message, means to generate a modulation and coding scheme (MCS) without coding rates in an MCS field in response to transmitting the TBS (where the size of the MCS field is one bit or two bits), and means to transmit the DCI having the MCS field on a downlink channel.

In another example, a non-transitory computer-readable medium for managing downlink control information (DCI) by a base station for wireless communications is disclosed. The non-transitory computer-readable medium includes codes executable by one or more processors to transmit a transport block size (TBS) based in a radio resource control (RRC) message, generate a modulation and coding scheme (MCS) without coding rates in an MCS field in response to transmitting the TBS (where the size of the MCS field is one bit or two bits), and transmit the DCI having the MCS field on a downlink channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

FIG. 1 is a block diagram illustrating a first example of a wireless communications system including a user equipment (UE) communicating with one or more base stations using modulation and coding scheme (MCS) in downlink control information (DCI), according to one or more of the presently described aspects.

FIG. 2 is a block diagram illustrating a second example of a wireless communications system including multiple UEs for communicating with one or more base stations using MCS in DCI, according to one or more of the presently described aspects.

FIG. 3 is a block diagram illustrating a third example of a UE communicating with a base station using MCS in DCI, in an access network, according to one or more of the presently described aspects.

FIG. 4 is a table having an example NR MCS in DCI for wireless communications, according to one or more of the presently described aspects.

FIG. 5A is a first example of prior art having system diagrams for an industrial control application.

FIG. 5B is a second example of prior art having parameters of example field level applications.

FIG. 6 is a flow chart of an example method of using proposed MCS in DCI by a UE, according to one or more of the presently described aspects.

FIG. 7 is a flow chart of an example method of using proposed MCS in DCI by a base station, according to one or more of the presently described aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

In wireless communications (e.g., in a 5G NR network), ultra-reliable low-latency communications (URLLC) may be used and may have strict requirements, for example, stringent reliability and latency. In some examples, URLLC may need very low packet error rate (PER) (e.g., $10^{-5}$ or $10^{-6}$) with very low latency (e.g., 1 ms to 10 ms). In an aspect, a downlink control channel, such as a physical downlink control channel (PDCCH), may be used for indicating or providing downlink (DL) and/or uplink (UL) grants. In some examples, to achieve the low PER requirements, PDCCH may need to be transmitted with high reliability. As such, new or improved approaches or schemes may be desired. In an example, reducing the payload size for downlink control information (DCI) may achieve higher reliability and the same or higher capacity on PDCCH. In some cases, DCI having a reduced MCS field for URLLC factory automation (FA) may be used, and the size of the reduced MCS field may be one bit or two bits, instead of five bits that are used in a regular DCI format (e.g., a DCI format used in a conventional communication system).

Each of the aspects described above are performed or implemented in connection with FIGS. 1-7 which are described in more detail below. In some aspects, the methods, techniques, or schemes discussed herein may be within the limits of current specifications of various wireless communication standards (e.g., 3GPP standards). In some examples, the techniques or methods discussed herein may be implemented by or reside in hardware or software at a user equipment (UE) or a base station.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. In some aspects, the computer-readable media may be non-transitory or include a non-transitory computer-readable storage medium.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Described herein are various aspects related to a wireless communications network, for example, a 5G NR network, in particular, techniques and schemes for using DCI having a reduced MCS field. In some examples, for URLLC FA, a one bit or two bit MCS field may be used in DCI on a PDCCH. In some implementations of URLLC FA use case, a transport block size (TBS) may be fixed most of the time. In this case, PDCCH may be compressed. Specifically, for example, the number of MCS bits in DCI may be reduced to one or two bits, from five bits that is used in a conventional LTE or 5G NR network.

In some aspects, for URLLC FA, a base station (e.g., a gNB) may send a TBS to one or more user equipments (UEs) through an RRC configuration or reconfiguration. In an aspect, a new type of DCI (having a reduced MCS field) or DCI format (e.g., for DL and/or UL grants), specific to URLLC FA, and having a reduced payload may be used by the base station and/or the one or more UEs. In an example, the UE may monitor or look for the new type of DCI (e.g., having a reduced MCS field) on PDCCH, if the TBS is signaled through an RRC message. In some cases, a new type of radio network temporary identifier (RNTI) (for the new type of DCI or DCI format) may be used to distinguish the new type of DCI from regular or conventional DCI. In one or more implementations, the MCS field of the new type of DCI is one bit or two bits. In some cases, the regular MCS table (used in a conventional LTE or 5G NR network) may not be used by the one or more UEs or the base station. In an aspect, a modulation order may be determined based on the new type of DCI, and the one or more UEs may calculate one or more coding rates based on at least one of the modulation order, the TBS, and resource assignment.

Referring to FIG. 1, in an aspect, a wireless communication system 100 includes at least one UE 12 in communication coverage of at least one network entity 14 or network entity 20. The UE 12 may communicate with a network via the network entity 14 or network entity 20. In some aspects, multiple UEs including the UE 12 may be in communication coverage with one or more network entities, including the network entity 14 and/or the network entity 20. In an aspect, the network entity 14 or network entity 20 may be a base station, such as an eNB in a 4G LTE network or a gNB in a 5G NR network. Although various aspects are described in relation to a UMTS, LTE, or a 5G NR network, similar principles may be applied in other wireless wide area networks (WWAN). The wireless network may employ a scheme where multiple base stations may transmit on a channel. In an example, the UE 12 may transmit and/or receive wireless communications (e.g., messages or signals with DCI to and/or from the network entity 14 and/or the network entity 20. For example, the UE 12 may be actively communicating with network entity 14 and/or network entity 20, for example, using DCI having a reduced MCS field.

In some aspects, the UE 12 may also be referred to by those skilled in the art (as well as interchangeably herein) as an NR UE, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. The UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for IoT (e.g., a NB-IoT device), an MTC device, or any other similar functioning device.

In some examples, the network entity 14 or network entity 20 may be referred to as a base station, a base transceiver station, a radio base station, a radio transceiver, a basic service set (BSS), an extended service set (ESS), a NodeB, eNodeB, Home NodeB, a Home eNodeB, a gNB or some other suitable terminology. The coverage area for the network entity 14 or network entity 20 may be divided into sectors making up only a portion of the coverage area (not shown). The wireless communications system 100 may include the network entity 14 and/or network entity 20 of different types (e.g., macro, micro, and/or pico base stations). The network entity 14 or network entity 20 may utilize different radio technologies, such as cellular and/or Wireless Local Area Network (WLAN) radio access technologies (RAT). The network entity 14 or network entity 20 may be associated with the same or different access networks or operator deployments. The coverage areas of the network entity 14 or network entity 20, including the coverage areas of the same or different types of the network entity 14 or network entity 20, utilizing the same or different radio technologies, and/or belonging to the same or different access networks, may overlap. Furthermore, the network entity 14 or network entity 20 may be substantially any type of component that may communicate with UE 12 to provide wireless network access at the UE 12.

According to the present aspects, the UE 12 may include one or more processors 103 and a memory 130 that may operate in combination with a communication component 40. The communication component 40 may comprise an RRC signaling component 42, TBS management component 44, DCI management component 46, MCS management component 48. In some cases, similarly, the network entity 14 or the network entity 20 may include or use one or more components discussed herein (or similar components) and be configured to generate or transmit DCI having a reduced MCS field, according to one or more aspects discussed herein.

In some examples, the communication component 40 may be configured to perform one or more communication (e.g., URLLC) management as discussed herein. In an aspect, the RRC signaling component 42 may be configured to transmit or receive RRC messages as described herein. In an aspect, the TBS management component 44 may be configured to identify, transmit or receive one or more TBSs, as discussed herein. In another aspect, the DCI management component 46 may be configured to determine, identify, or decode DCI information, as discussed herein. In another aspect, the MCS management component 48 may be configured to identify MCS information in DCI based on a reduced MCS field (e.g., one or two bits).

In some aspects, the communication component 40 may be communicatively coupled with a transceiver 106, which may include a receiver 32 for receiving and processing radio frequency (RF) signals (e.g., including DCI, resource allocation, or grants), and a transmitter 34 for processing and transmitting RF signals. A processor 103 may be communicatively coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver 32 may receive signals transmitted by the UE 12, one or more other UEs 12 and/or one or more network entities (e.g., the network entity 14 or network entity 20). The receiver 32 may obtain measurements of the signals. For example, the receiver 32 may determine signal-to-noise ratio (SNR), RSRP, etc.

The transmitter 34 may include hardware, firmware, and/ or software code executable by a processor for transmitting data, the code comprising instructions and being stored in a memory (e.g., computer-readable medium). The transmitter 34 may be, for example, a RF transmitter.

In an aspect, the one or more processors 103 may include a modem 108 that uses one or more modem processors. The various functions related to the communication component 40 may be included in the modem 108 and/or processor(s) 103 and, in an aspect, may be executed by a single processor, while in other aspects, different ones of the functions may be executed by a combination of two or more different processors. For example, in an aspect, the one or more processors 103 may include any one or any combination of a modem processor, or baseband processor, or digital signal processor, or transmit processor, or transceiver processor associated with the transceiver 106. In particular, the one or more processors 103 may implement components included in the communication component 40, including the RRC signaling component 42, TBS management component 44, DCI management component 46, and/or MCS management component 48.

The communication component 40, RRC signaling component 42, TBS management component 44, DCI management component 46, and/or MCS management component 48, may include hardware, firmware, and/or software code executable by a processor for performing DCI management and related operations. For example, the hardware may include, for example, a hardware accelerator, or specialized processor. In an aspect, the term "component" as used herein may be one of the parts that make up a system, may be hardware, firmware, and/or software, and may be divided into other components.

Moreover, in an aspect, the UE 12 may include an RF front end 104 and the transceiver 106 for receiving and transmitting radio transmissions, for example, wireless communications 26. For example, transceiver 106 may transmit or receive one or more signals. The transceiver 106 may measure a received pilot signal in order to determine signal quality (e.g., based on RSRP, RSRQ, or RSSI) and for providing feedback to the network entity 14 or network entity 20. For example, the transceiver 106 may communicate with the modem 108 to transmit messages generated by the communication component 40 and to receive messages and forward them to the communication component 40.

The RF front end 104 may be communicatively couple with one or more antennas 102 and may include one or more low-noise amplifiers (LNAs) 141, one or more switches 142, 143, 146, one or more power amplifiers (PAs) 145, and one or more filters 144 for transmitting and receiving RF signals. In an aspect, the components of the RF front end 104 may be communicatively coupled with the transceiver 106 (e.g., via one or more communication links or buses 110). The transceiver 106 may be communicatively coupled with one or more modems 108 and/or processor 103.

In an aspect, the LNA 141 may amplify a received signal at a desired output level. In an aspect, each LNA 141 may have a specified minimum and maximum gain values. In an aspect, the RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the communication component 40.

The one or more PA(s) 145 may be used by the RF front end 104 to amplify a signal for an RF output at a desired output power level. In an aspect, each PA 145 may have a specified minimum and maximum gain values. In an aspect, the RF front end 104 may use one or more switches 143, 146 to select a particular PA 145 and a specified gain value of the PA 145 based on a desired gain value for a particular application.

The one or more filters 144 may be used by the RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be communicatively coupled with a specific LNA 141 and/or PA 145. In an aspect, the RF front end 104 may use one or more switches 142, 143, 146 to select a transmit or receive path using a specified filter 144, LNA, 141, and/or PA 145, based on a configuration as specified by the transceiver 106 and/or processor 103.

The transceiver 106 may be configured to transmit and receive wireless signals through one or more antennas 102 via the RF front end 104. In an aspect, the transceiver 106 may be tuned to operate at specified frequencies such that the UE 12 may communicate with, for example, the network entity 14 or network entity 20. In an aspect, for example, the modem 108 may configure the transceiver 106 to operate at a specified frequency and power level based on the UE configuration of the UE 12 and communication protocol used by the modem 108.

In an aspect, the modem 108 may be a multiband-multimode modem, which may process digital data and communicate with the transceiver 106 such that the digital data is sent and received using the transceiver 106. In an aspect, the modem 108 may be multiband and be configured to support multiple frequency bands for a specific communications protocol. In an aspect, the modem 108 may be multi-mode and be configured to support multiple operating networks and communications protocols. In an aspect, the modem 108 may control one or more components of the UE 12, or the network entity 14 or 20 (e.g., RF front end 104, transceiver 106), to perform DL/UL grants and DCI related procedures or enable transmission and/or reception of signals based on a specified modem configuration. In an aspect, the modem configuration may be based on the mode of the modem and the frequency band in use. In another aspect, the modem configuration may be based on UE configuration information associated with the UE 12 as provided by the network during MCS management, cell selection and/or cell reselection (or handover).

In some aspects, the UE 12 may further include memory 130, such as for storing data used herein and/or local versions of applications or the communication component 40 and/or one or more subcomponents of the communication component 40 being executed by the processor(s) 103. The memory 130 may include any type of computer-readable medium usable by a computer or processor(s) 103, such as random access memory (RAM), read only memory (ROM), tapes, magnetic discs, optical discs, volatile memory, non-volatile memory, and any combination thereof. In an aspect, for example, the memory 130 may be a computer-readable storage medium that stores one or more computer-executable codes defining communication component 40 and/or one or more of the subcomponents of the communication component 40, and/or data associated therewith, when the UE 12 and/or the network entity 14 or network entity 20 is operating the processor(s) 103 to execute the communication component 40 and/or one or more subcomponents of the communication component 40. In another aspect, for example, the memory 130 may be a non-transitory computer-readable storage medium.

Referring to FIG. 2, a diagram illustrates an example of a wireless communications system 200, in accordance with aspects described herein. In some examples, the wireless communications system 200 may include the wireless communications system 100 in FIG. 1, and may include a plurality of network entities 14 and/or 20 (e.g., base stations, gNBs, or WLAN network entity), a number of UEs 12, and a core network 230. For example, the core network 230 may be an Evolved Packet Core (EPC) and/or a 5G core (5 GC). In an aspect, one or more UEs 12, or network entities 14 and/or 20, may include the communication component 40 configured to identify, transmit or receive MCS information in DCI. The communication component 40 may be configured to perform at least some aspects of the techniques or methods described above in wireless communications, including 4G LTE or 5G NR. Some of the network entity 14 or 20 may communicate with the UEs 12 under the control of a base station controller (not shown), which may be part of the core network 230 or the network entity 14 or the network entity 20 (e.g., a base station or a gNB) in various examples.

In an aspect, the network entity 14 or 20 may communicate control or system information and/or user data with the core network 230 through backhaul links 232. In some cases, the network entity 14 or 20 may communicate, either directly or indirectly, with each other over backhaul links 234, which may be wired or wireless communication links. The wireless communications system 200 may support operation on multiple carriers (waveform signals of different frequencies). Multi-carrier transmitters may transmit modulated signals simultaneously on the multiple carriers. For example, each communication link 225 (e.g., wireless communications 26 in FIG. 1) may be a multi-carrier signal modulated according to the various radio technologies described above. Each modulated signal may be sent on a same or different carrier and may carry control or system information (e.g., control channels, RRC signals, etc.), overhead information, data, etc.

In some examples, the network entity 14 or 20 may wirelessly communicate with the UEs 12 via one or more antennas 102. The one or more antennas 102 may include one or more antennas, antenna elements and/or antenna arrays. Each of the network entity 14 or 20 may provide communication coverage for a respective coverage area 210. In some examples, the network entity 14 or 20 may be referred to as a base station, a NodeB, an eNodeB, a Home NodeB, a Home eNodeB, a gNB, or an access point. In some cases, at least a portion of the wireless communications system 200 may be configured to operate on a spatial multiplexing (e.g., multiple-input and multiple-output (MIMO)) scheme in which one or more of the UEs 12 and one or more of the network entity 14 or 20 may be configured to support transmissions on closed-loop MIMO and/or open-loop MIMO scheme.

In wireless communication systems using 4G (e.g., LTE/LTE-A), 5G NR, or similar communication technologies, the terms evolved Node B (eNodeB or eNB) or gNB may be used to describe the network entity 14 or 20, though concepts described herein may be applied to other types of network entity in other types of communication technologies. For example, the wireless communications system 200 may be a 4G or a 5G NR network in which different types of network entity provide coverage for various geographical regions. For example, each network entity 14 or 20 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 12 with service subscriptions with the network provider. A small cell may cover a relatively smaller geographic area and may allow unrestricted access by UEs 12 with service subscriptions with the network provider, for example, and in addition to unrestricted access, may also provide restricted access by UEs 12 having an association with the small cell (e.g., UEs in a closed subscriber group (CSG), UEs for users in the home, and the like). A base station for a macro cell may be referred to as a macro base station. A base station for a small cell may be referred to as a small cell base station. A base station may support one or multiple (e.g., two, three, four, and the like) cells.

In some aspects, the core network 230 may communicate with the base stations or other network entity 14 or 20 via one or more backhaul links 232 (e.g., S1 interface, etc.). The network entity 14 or 20 may also communicate with one another, e.g., directly or indirectly via backhaul links 234 (e.g., X2 interface, etc.) and/or via backhaul links 232 (e.g., through core network 230). The backhaul links 232, 234 may be wired or wireless.

In some examples, the UEs 12 may be dispersed throughout the wireless communications system 200, and each UE 12 may be stationary or mobile (e.g., in a low mobility mode). The UE 12 may be referred to by those skilled in the art as a suitable terminology discussed herein. The UE 12 may be able to communicate with macro base stations, small cell base stations, relays, and the like. The UE 12 may be able to communicate over different access networks, such as cellular or other WWAN access networks, or WLAN access networks.

The communication links 225 (e.g., wireless communications 26 in FIG. 1) shown in wireless communications system 200 may include uplink transmissions from the UE 12 to the network entity 14 or 20, and/or downlink transmissions (e.g., resource allocation, PDCCH, RRC signals) from the network entity 14 or 20 to the UE 12. The downlink transmissions may also be called forward link transmissions while the uplink transmissions may also be called reverse link transmissions. The communication links 225 may carry transmissions of each hierarchical layer which, in some examples, may be multiplexed in the communication links 225. The UEs 12 may be configured to collaboratively communicate with multiple network entity 14 or 20 through, for example, MIMO, carrier aggregation (CA), Coordinated Multi-Point (CoMP), or other schemes. MIMO techniques use multiple antennas on the network entity 14 or 20 and/or multiple antennas on the UE 12 to transmit multiple data streams. The MIMO techniques may include closed-loop MIMO and/or open-loop MIMO scheme. Carrier aggregation (CA) may utilize two or more component carriers (CCs) on a same or different serving cell for data transmission. CoMP may include techniques for coordination of transmission and reception by a number of network entity 14 or 20 to improve overall transmission quality for UEs 12 as well as increasing network and spectrum utilization.

Referring to FIG. 3, a block diagram illustrates an example of a base station 310 (e.g., the network entity 14 or 20) in communication with a UE 350 (e.g., the UE 12) in an access network (e.g., the wireless communications system 100 and/or 200). In the downlink, upper layer packets from the core network are provided to a controller/processor 375. The controller/processor 375 implements the functionality of the L2 layer. In the downlink, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling (e.g., resource allocation, RRC signals) to the UE 350.

In addition, the base station 310 may include a communication component 40 configured to manage schemes of MCS or DCI generation and transmission. Though the communication component 40 is shown as communicatively coupled with controller/processor 375, substantially any processor of the base station 310 may provide the functions of the communication component 40 and/or the related components described herein (e.g., in conjunction with controller/processor 375, memory 376, or otherwise). For example, TX processor 316 and/or RX processor 370 may additionally or alternatively provide one or more functions of the communication component 40, as described herein.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through a respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 implements the L2 layer. The controller/processor may be associated with a memory 360 that stores program codes and data. The memory 360 may be referred to as a computer-readable medium. In the uplink, the controller/processor 359 provides demultiplexing (DEMUX) between transport and logical channels, packet reassembly, deciphering, header decompression, control signal processing to recover upper layer packets from the core network. The upper layer packets are then provided to a data sink 362, which represents all the protocol layers above the L2 layer. Various control signals may be provided to the data sink 362 for L3 processing. The controller/processor 359 may be responsible for error detection using an acknowledgement (ACK) and/or negative acknowledgement (NACK) protocol to support HARQ operations. In addition, the UE 350 may include a communication component 40 configured to manage schemes of MCS or DCI detection and reception. Though the communication component 40 is shown as communicatively coupled with controller/processor 359, substantially any processor of the UE 350 may provide the functions of the communication component 40 and/or the related components described herein (e.g., in conjunction with controller/processor 359, memory 360, or otherwise). For example, TX processor 368 and/or RX processor 356 may additionally or alternatively provide one or more functions of the communication component 40, as described herein.

In the uplink, a data source 367 is used to provide upper layer packets to the controller/processor 359. The data source 367 represents all protocol layers above the L2 layer. Similar to the functionality described in connection with the downlink transmission by the base station 310, the controller/processor 359 implements the L2 layer for the user plane and the control plane by providing header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 may be associated with a memory 376 that stores program codes and data. The memory 376 may be referred to as a computer-readable medium. In the uplink, the controller/processor 375 provides demultiplexing (DEMUX) between transport and logical channels, packet reassembly, deciphering, header decompression, control signal processing to recover upper layer packets from the UE 350. Upper layer packets from the controller/processor 375 may be provided to the core network. The controller/processor 375 may be responsible for error detection using an ACK and/or NACK protocol to support HARQ operations.

Referring to FIG. 4, in a wireless communication network (e.g., an LTE or 5G NR network), an MCS Table 400 may be used to indicate MCS or MCS information, and MCS is one of multiple fields in DCI information bits used for DL and/or UL grants. In some implementations, five bits may be allocated to the MCS field in DCI, having 32 possibilities (0 to 31). For example, the MCS Table 400 may include an MCS index (five bits with values from 0 to 31), one or more modulation orders or formats (e.g., QPSK, 16QAM, and/or 64QAM), one or more coding rates (or code rates), and a value of efficiency. In some examples, a UE (e.g., UE 12) may determine a modulation order and/or a coding rate, for DL or UL communications, based on the MCS Table 400.

In an aspect, for example, the MCS Table 400 may be an NR MCS table used for physical downlink shared channel (PDSCH) and/or cyclic prefix orthogonal frequency division multiplexing (CP-OFDM) physical uplink shared channel (PUSCH) with a maximum modulation order of 64.

In some aspects, referring to FIG. 5A and FIG. 5B, some conventional solutions of wireless communications in industrial automation, for example, FA are illustrated. For example, an industrial control application 502 is shown with various control cycle and timing parameters, while an industrial control application 504 (may be same as 502) is shown with a system model and set of requirements. In an example, a Table 506 illustrates parameters of example field level applications.

In some other aspects, various new or improved techniques for using DCI having a reduced MCS field are presented herein. In some FA scenarios, traffic may be periodic and predictable for a sensor/actuator (S/A) and/or programmable logic controller (PLC). In some examples, the packet size is small and may not change dynamically. In other words, in some cases, the transport block size (TBS) may not change dynamically. In an aspect, the TBS may be signaled to a UE (e.g., UE 12) through RRC. In another aspect, separate TBS may be used, and may be specified for DL or UL. In some cases, the TBS for DL or UL may be the same or different.

In some examples, the TBS may stay the same most of the time, but may change occasionally. In an example, a new type of RNTI or separate RNTI for the new type of DCI discussed herein, may be used to distinguish the new type of DCI from regular DCI or conventional DCI in a conventional communication system. In some cases, a default or predetermined TBS value may be signaled to the UE through RRC signaling. In an aspect, the UE may store or use the default or predetermined TBS for future communications with the network.

In some examples, at any given scheduling interval, if the actual TBS is the same as the default TBS, then the new type of or specific RNTI is used for the new DCI. In FA scenarios, this scheme may be used most of the time. If for any reason, the actual packet size is different from the default TBS, then regular DCI with a regular RNTI may be used. If the TBS changes and then remains the same for a predetermined time (the change in TBS is persistent), then a new RRC message with the new TBS size may be sent.

In an aspect, application-layer zero-padding may be used when the actual TBS is smaller than the default TBS. However, using zero-padding overhead(s) may be inefficient.

In some aspects, given that TBS is known at the UE (e.g., through RRC), the number of bits for the MCS field in the DCI may be reduced. For example, with known or identified TBS, the UE may only need to know or identify the modulation order. In some cases, the coding rate may not be necessarily included in the MCS field or MCS table, since the coding rate may be derived, determined, or calculated based on known or identified information. In an example, a coding rate may be calculated based on resource block (RB) allocation, TBS, and/or modulation order. In some cases, instead of using 32 possibilities for MCS (five bits), UE may use three possibilities (e.g., QPSK, 16QAM, and 64QAM) or four possibilities (e.g., QPSK, 16QAM, 64QAM and 256QAM) in a reduced MCS field that is reduced from five bits to two bits.

In some examples, a reduced (e.g., one bit) MCS field in DCI for URLLC FA may be used. In an example, the new type of MCS index achieves ten percent (10%) gain for small DCI size, e.g., ~forty bits in payload). For example, in a first MCS scheme, the UE or base station may be configured to transmit or receive signals with a modulation order or format of QPSK or 16QAM. For example, the UE may receive DCI having a one bit MCS field that indicates QPSK (MCS=0), or 16QAM (MCS=1). In another example, the UE may receive DCI having a one bit MCS field that indicates QPSK (MCS=1), or 16QAM (MCS=0). For very small Block Error Rate (BLER) requirements in URLLC, 64QAM may not be used.

In a second MCS scheme that may be applicable to DL grants, in an aspect, the UE or base station may use one bit (bit "0" or bit "1") MCS, which may be interpreted as:

"0": Assume using QPSK;

"1": Assume using 16QAM, if aggregation level (AL) of the DCI is larger than a threshold (e.g., if AL>1); and assume using 64 QAM otherwise (e.g., if AL=1: this indicates that the UE is in very good condition). A base station may take this rule into account when choosing AL for DCI, and MCS for PDSCH.

In some examples, the UE is in very good condition because the UE has very high SNR or signal-to-interference-and-noise ratio (SINR). In some cases, when SNR or SINR is high, larger modulation order (e.g., 64QAM) for PDSCH, and smaller AL for DCI or PDCCH, may be used or applied.

Alternatively, in an example, "0" may be used to indicate 16QAM, and "1" may be used to indicate either QPSK or 64QAM, depending on the AL (e.g., better distinction).

In a third MCS scheme, the UE or base station may be configured to communicate using either a first set of modulation orders having QPSK and 16QAM, or a second set of modulation orders having 16QAM and 64QAM. In other words, the UE or base station may be configured to transmit or receive signals using one modulation order from the first set or the second set of modulation orders, and each set has two modulation orders. In some examples, a value in RRC signaling may be used to identify or determine which set of modulation orders to use, and may be changed semi-statically per UE, depending on the UE condition. In some examples, the UE condition may be an SNR or SINR condition of the UE. For example, a first UE (e.g., a cell-center UE) may be configured through RRC message(s) or signal(s) to assume (or to be indicated) a modulation order of 16QAM or 64QAM, and a second UE (e.g., a cell-edge UE) may be configured to assume a modulation order of QPSK or 16QAM. In some cases, as UE condition changes from cell-center to cell-edge or vice versa, RRC signaling may update the set of modulation orders for the first UE and/or the second UE to assume. In some situations, the updated set of modulation orders may be indicated to the first UE and/or the second UE through RRC signaling or a downlink control channel (e.g., DCI on PDCCH).

Referring to FIG. 6, in an operational aspect, a UE, such as UE 12 in FIG. 1 may perform one or more aspects of a method 600 for using DCI having a reduced MCS field in a wireless communications system (e.g., a 4G or a 5G NR system). For example, one or more of the processors 103, memory 130, modem 108, transceiver 106, communication component 40, RRC signaling component 42, TBS management component 44, DCI management component 46, and/ or MCS management component 48, may be configured to perform one or more aspects of the method 600.

In an aspect, at block 602, the method 600 may include receiving an RRC message. In an aspect, for example, the communication component 40, and/or RRC signaling component 42, e.g., in conjunction with one or more of the processors 103, memory 130, modem 108, and/or transceiver 106, may be configured to receive, via transceiver 106, an RRC message, as discussed herein.

In another aspect, at block 604, the method 600 may include identifying a TBS based on the received RRC message. In an aspect, for example, the communication component 40, and/or TBS management component 44, e.g., in conjunction with one or more of the processors 103, memory 130, modem 108, and/or transceiver 106, may be configured to identifying a TBS based on the received RRC message, as discussed herein.

In an aspect, at block 606, the method 600 may include receiving DCI on a downlink channel with the DCI including a resource assignment. In an aspect, for example, the communication component 40, and/or DCI management component 46, e.g., in conjunction with one or more of the processors 103, memory 130, modem 108, and/or transceiver 106, may be configured to receive DCI on a downlink channel (e.g., PDCCH) with the DCI including a resource assignment, as discussed herein.

In another aspect, at block 608, the method 600 may optionally include identifying an RNTI associated with the DCI based on the determination. In an aspect, for example, the communication component 40, and/or DCI management component 46, e.g., in conjunction with one or more of the processors 103, memory 130, modem 108, and/or transceiver 106, may be configured to identify an RNTI associated with the DCI based on the determination at block 608, as discussed herein.

In another aspect, at block 610, the method 600 may optionally include determining the identified TBS is the same as a predetermined TBS based on the identified RNTI. In an aspect, for example, the communication component 40, and/or TBS management component 44, e.g., in conjunction with one or more of the processors 103, memory 130, modem 108, and/or transceiver 106, may be configured to determine the identified TBS is the same as a predetermined or default TBS based on the identified RNTI at block 608, as discussed herein. When the identified TBS is the same as the predetermined TBS, the method 600 proceeds to block 612. When the identified TBS is not the same as the predetermined TBS, the method 600 ends and the coding rate is determined using the conventional methodology.

In another aspect, at block 612, the method 600 may include identifying a modulation order using the MCS field of the DCI, wherein the size of the MCS field is one bit or two bits. In an aspect, for example, the communication component 40, RRC signaling component 42, DCI management component 46, and/or MCS management component 48, e.g., in conjunction with one or more of the processors 103, memory 130, modem 108, and/or transceiver 106, may be configured to identify a modulation order using the MCS field of the received DCI, and the size of the MCS field is reduced from five bits to one bit or two bits, as discussed herein.

The modulation order is selected from one or more sets with each including two or four modulation orders. The sets of modulation orders may include one or more of the following sets: {QPSK, 16QAM}, {16QAM, 64QAM}, or {64QAM, 256QAM} for a one bit MCS field. For example, if the first set is used, a "0" indicates a QPSK modulation order and a "1" indicates a 16QAM modulation order, if the second set is used, a "0" indicates a 16QAM modulation order and a "1" indicates a 64QAM modulation order and if the third set is used, a "0" indicates a 64QAM modulation order and a "1" indicates a 256QAM modulation order. For a two bit MCS field, the set may be {QPSK, 16QAM, 64QAM, 256QAM} with "00" indicating a QPSK modulation order, "01" indicating a 16QAM modulation order, "10" indicating a 64 QAM modulation order and "11" indicating a 256QAM modulation order.

In one aspect, one set of modulation orders may be used. For example, the set may be {QPSK, 16QAM} with the MCS field being one bit and in another example, the set may be {QPSK, 16QAM, 65QAM, 256QAM} with the MCS field being two bits. In another aspect, for one bit MCS fields, identifying the modulation order may include, determining whether an AL of the DCI is larger than a threshold, identifying a first modulation in response to determining that the AL is larger than the threshold (e.g., 1) and identifying a second modulation order in response to determining that the AL is less than or equal to the threshold (e.g., 1). In another aspect, for one bit MCS fields, there may be more than one set of modulation orders. In another aspect, identifying the modulation order for a one bit MCS field may include, identifying a set of modulation orders based on a RRC configuration or RRC reconfiguration in the RRC message. The number of sets of modulation orders may be one, two or three sets. Once a set of modulation orders is identified, the value of the MCS field identifies the modulation order. In another aspect, identifying the modulation order for a one bit MCS field may include, identifying a set of modulation orders based on the AL of the DCI. The number of sets of modulation orders may be one, two or three sets. Once a set of modulation orders is identified, the value of the MCS field identifies the modulation order. In another aspect, the identifying of the set of modulation orders to use may include using a fixed set known to the UE. For example, the fixed set is dictated by a standard. The fixed set may be stored in the memory of the UE.

In another aspect, at block 614, the method 600 may include calculating a coding rate based on at least the identified TBS, the identified modulation order and resource assignment. In an aspect, for example, the communication component 40, TBS management component 44, DCI management component 46, and/or MCS management component 48, e.g., in conjunction with one or more of the processors 103, memory 130, modem 108, and/or transceiver 106, may be configured to calculate a coding rate based on at least the identified TBS, the identified modulation order and resource assignment, as discussed herein.

Referring to FIG. 7, in an operational aspect, a base station (e.g., network entity 14 or 20) may perform one or more aspects of a method 700 for using DCI having a reduced MCS field in a wireless communications system (e.g., a 4G or a 5G NR system). For example, one or more of the processors 103, memory 130, modem 108, transceiver 106, communication component 40, RRC signaling component 42, TBS management component 44, DCI management component 46, and/or MCS management component 48, may be configured to perform one or more aspects of the method 700.

In an aspect, at block 702, the method 700 may include transmitting a TBS in an RRC message. In an aspect, for example, the communication component 40, RRC signaling component 42, and/or TBS management component 44, e.g., in conjunction with one or more of the processors 103, memory 130, modem 108, and/or transceiver 106, may be configured to transmit, via transceiver 106, a TBS in an RRC message, as discussed herein. If there are multiple sets of modulation orders that the UE may use, the base station may identify which set to use via an indicator in the RRC message, e.g., an RRC configuration or RRC reconfiguration. In an aspect, for example, the communication component 40, RRC signaling component 42, and/or TBS management component 44, e.g., in conjunction with one or more of the processors 103, memory 130, modem 108, and/or transceiver 106, may be configured to transmit, via transceiver 106, a TBS in an RRC message with an indicator (e.g., an RRC configuration or RRC reconfiguration) indicating which set of the multiple sets of modulation orders that the UE should use.

In another aspect, at block 704, the method 700 may include generating an MCS without coding rates in an MCS field in response to transmitting the TBS, wherein the size of the MCS field is one bit or two bits. In an aspect, for example, the communication component 40, and/or MCS management component 48, e.g., in conjunction with one or more of the processors 103, memory 130, modem 108, and/or transceiver 106, may be configured to generate an MCS (having no coding rates) in the MCS field in response to transmitting the TBS, and the size of the MCS field is reduced from five bits to one bit or two bits, as discussed herein.

In an aspect, at block 706, the method 700 may include transmitting the MCS field in DCI on a downlink channel, wherein the size of MCS field in the DCI is reduced. In an aspect, for example, the communication component 40, DCI management component 46, and/or MCS management component 48, e.g., in conjunction with one or more of the processors 103, memory 130, modem 108, and/or transceiver 106, may be configured to transmit the MCS field in DCI on a downlink channel, and the size of MCS field in the DCI is reduced to one bit or two bits, as discussed herein.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a telecommunications system have been presented with reference to a 4G or a 5G NR system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Moreover, nothing disclosed herein is intended to be dedicated to the public regardless of whether such disclosure is explicitly recited in the claims.

SOME FURTHER EXAMPLE EMBODIMENTS

An example method of wireless communications for a user equipment (UE), comprising: receiving a radio resource control (RRC) message; identifying a transport block size (TBS) based on the received RRC message; receiving downlink control information (DCI) on a downlink channel with the DCI including a resource assignment; identifying a modulation order using a modulation and coding scheme (MCS) in an MCS field of the DCI, wherein the size of the MCS field is one bit or two bits; and calculating a coding rate based on at least the identified TBS, the identified modulation order and the resource assignment.

The above example method, wherein calculating the coding rate comprises calculating the coding rate based on the resource assignment.

One or more of the above example methods, wherein the RRC message includes RRC configuration or RRC reconfiguration.

One or more of the above example methods, wherein the DCI is used for ultra-reliable and low latency communication (URLLC) factory automation (FA).

One or more of the above example methods, wherein the size of the MCS field is one bit, and wherein identifying the modulation order using the MCS field of the DCI comprises: determining whether an aggregation level (AL) of the DCI is larger than a threshold; identifying a first modulation order in response to a determination that the AL is larger than the threshold; and identifying a second modulation order in response to a determination that the AL is less than or equals to the threshold.

One or more of the above example methods, wherein the size of the MCS field is one bit, and wherein identifying the modulation order using the MCS field of the DCI comprises: identifying the modulation order from a first set of modulation orders or a second set of modulation orders, wherein each set of modulation orders has at least two modulation orders and is based on a value of the MCS field of the DCI.

One or more of the above example methods, wherein the size of the MCS field is one bit, and wherein identifying the modulation order using the MCS field of the DCI comprises: identifying a set of modulation orders, based on a RRC configuration in the RRC message, from one of a first set of modulation orders or a second set of modulation orders; and identifying the modulation order, based on a value of the MCS field of the DCI, from the identified set of modulation orders, wherein each set of modulation orders has at least two modulation orders.

One or more of the above example methods, wherein the size of the MCS field is one bit, and wherein identifying the modulation order using the MCS field of the DCI comprises: identifying a set of modulation orders, based on an aggregation level (AL) of the DCI, from one of a first set of modulation orders or a second set of modulation orders; and identifying the modulation order, based on a value of the MCS field of the DCI, from the identified set of modulation orders, wherein each set of modulation orders has at least two modulation orders.

One or more of the above example methods, wherein identifying the modulation code using the MCS field of the DCI comprises: identifying a radio network temporary identifier (RNTI) associated with the DCI; and determining the identified TBS is the same as a predetermined TBS based on the identified RNTI.

One or more of the above example methods, wherein the downlink channel is a physical downlink control channel (PDCCH).

One or more of the above example methods, wherein identifying the modulation order based on the identified MCS comprises: identifying a set of modulation orders, based on a RRC configuration in the RRC message or a fixed set known to the UE, from at least one set of modulation orders; and identifying the modulation order, based on a value of the MCS field of the DCI, from the identified set of modulation orders, wherein the at least one set of modulation orders comprises at least one of {Quadrature Phase Shift Keyed (QPSK), 16 Quadrature Amplitude Modulator (QAM)}, {16QAM, 64 QAM}, or {64QAM, 256 QAM} for a one bit MCS field or the at least one set of modulation orders comprises {QPSK, 16QAM, 64QAM, 256QAM} for a two bit MCS field.

An example device (e.g., UE) comprising a transceiver, a memory configured to store instructions, and one or more processors communicatively coupled with the transceiver and the memory, wherein the one or more processors are configured to perform all or part of one or more of the above example methods.

An example apparatus for use in a device (e.g., UE) comprising means for wireless communication, means for storing instructions and data, and means for performing all or part of one or more of the above example methods.

A second example method of wireless communications for a base station, comprising: transmitting a transport block size (TBS) in a radio resource control (RRC) message; generating a modulation and coding scheme (MCS) without coding rates in an MCS field in response to transmitting the TBS, wherein the size of the MCS field is one bit or two bits; and transmitting downlink control information (DCI) having the MCS field on a downlink channel.

The second example method as above, wherein the RRC message includes RRC configuration or RRC reconfiguration.

One or more of the second example methods as above, wherein the DCI is used for ultra-reliable and low latency communication (URLLC) factory automation (FA).

One or more of the second example methods as above, wherein the downlink channel is a physical downlink control channel (PDCCH).

Another example device (e.g., a base station) comprising a transceiver, a memory configured to store instructions, and one or more processors communicatively coupled with the transceiver and the memory, wherein the one or more processors are configured to perform all or part of one or more of the above second example methods.

Another example apparatus for use in a device (e.g., base station) comprising means for wireless communication, means for storing instructions and data, and means for performing all or part of one or more of the above second example methods.

What is claimed is:

1. A method of wireless communications for a user equipment (UE), comprising:
    receiving a radio resource control (RRC) message;
    identifying a transport block size (TBS) based on the received RRC message;
    receiving downlink control information (DCI) on a downlink channel with the DCI including a resource assignment;
    identifying a modulation order using a modulation and coding scheme (MCS) in an MCS field of the DCI and either an aggregation level (AL) of the DCI or a radio network temporary identifier (RNTI) associated with the DCI, wherein the size of the MCS field is one bit; and
    calculating a coding rate based on at least the identified TBS, the identified modulation order and the resource assignment.

2. The method of claim 1, wherein calculating the coding rate comprises calculating the coding rate based on the resource assignment.

3. The method of claim 1, wherein the RRC message includes RRC configuration or RRC reconfiguration.

4. The method of claim 1, wherein the DCI is used for ultra-reliable and low latency communication (URLLC) factory automation (FA).

5. The method of claim 1, wherein identifying the modulation order using the MCS field of the DCI and the AL of the DCI comprises:
    determining whether the AL of the DCI is larger than a threshold;
    identifying a first modulation order in response to a determination that the AL is larger than the threshold; and
    identifying a second modulation order in response to a determination that the AL is less than or equals to the threshold.

6. The method of claim 1, wherein identifying the modulation order using the MCS field of the DCI comprises:
    identifying the modulation order from a first set of modulation orders or a second set of modulation orders, wherein each set of modulation orders has at least two modulation orders and is based on a value of the MCS field of the DCI.

7. The method of claim 1, wherein identifying the modulation order using the MCS field of the DCI comprises:
    identifying a set of modulation orders, based on a RRC configuration in the RRC message, from one of a first set of modulation orders or a second set of modulation orders; and identifying the modulation order, based on a value of the MCS field of the DCI, from the identified set of modulation orders,
wherein each set of modulation orders has at least two modulation orders.

8. The method of claim 1, wherein identifying the modulation order using the MCS field of the DCI and the AL of the DCI comprises:
identifying a set of modulation orders, based on the AL of the DCI, from one of a first set of modulation orders or a second set of modulation orders; and
identifying the modulation order, based on a value of the MCS field of the DCI, from the identified set of modulation orders,
wherein each set of modulation orders has at least two modulation orders.

9. The method of claim 1, wherein identifying the modulation code using the MCS field of the DCI and the RNTI associated with the DCI comprises:
identifying the RNTI associated with the DCI; and
determining the identified TBS is the same as a predetermined TBS based on the identified RNTI.

10. The method of claim 1, wherein the downlink channel is a physical downlink control channel (PDCCH).

11. The method of claim 1, wherein identifying the modulation order based on the identified MCS comprises:
identifying a set of modulation orders, based on a RRC configuration in the RRC message or a fixed set known to the UE, from at least one set of modulation orders; and
identifying the modulation order, based on a value of the MCS field of the DCI, from the identified set of modulation orders,
wherein the at least one set of modulation orders comprises at least one of {Quadrature Phase Shift Keyed (QPSK), 16 Quadrature Amplitude Modulator (QAM), }16QAM, 64 QAM}, or {64QAM, 256 QAM} for a one bit MCS field.

12. A user equipment (UE) comprising:
a transceiver;
a memory configured to store instructions; and
one or more processors communicatively coupled with the transceiver and the memory, wherein the one or more processors are configured to:
receive a radio resource control (RRC) message;
identify a transport block size (TB S) based on the received RRC message;
receive downlink control information (DCI) on a downlink channel with the DCI including a resource assignment;
identify a modulation order using a modulation and coding scheme (MCS) in an MCS field of the DCI and either an aggregation level (AL) of the DCI or a radio network temporary identifier (RNTI) associated with the DCI, wherein the size of the MCS field is one bit; and
calculate a coding rate based on at least the identified TBS, the identified modulation order and the resource assignment.

13. The UE of claim 12, wherein the one or more processors are configured to calculate the coding rate based on the resource assignment.

14. The UE of claim 12, wherein the RRC message includes RRC configuration or RRC reconfiguration.

15. The UE of claim 12, wherein the DCI is used for ultra-reliable and low latency communication (URLLC) factory automation (FA).

16. The UE of claim 12, wherein the one or more processors are configured to:
determine whether the AL of the DCI is larger than a threshold;
identify a first modulation order in response to a determination that the AL is larger than the threshold; and
identify a second modulation order in response to a determination that the AL is less than or equals to the threshold.

17. The UE of claim 12, wherein the one or more processors are configured to identify the modulation order from a first set of modulation orders or a second set of modulation orders, wherein each set of modulation orders has at least two modulation orders and is based on a value of the MCS field of the DCI.

18. The UE of claim 12, wherein the one or more processors are configured to:
identify a set of modulation orders, based on a RRC configuration in the RRC message, from one of a first set of modulation orders or a second set of modulation orders; and
identify the modulation order, based on a value of the MCS field of the DCI, from the identified set of modulation orders,
wherein each set of modulation orders has at least two modulation orders.

19. The UE of claim 12, wherein and the one or more processors are configured to:
identify a set of modulation orders, based on the AL of the DCI, from one of a first set of modulation orders or a second set of modulation orders; and
identify the modulation order, based on a value of the MCS field of the DCI, from the identified set of modulation orders,
wherein each set of modulation orders has at least two modulation orders.

20. The UE of claim 12, wherein the one or more processors are configured to:
identify the RNTI associated with the DCI; and
determine the identified TBS is the same as a predetermined TBS based on the identified RNTI.

21. The UE of claim 12, wherein the downlink channel is a physical downlink control channel (PDCCH).

22. The UE of claim 12, wherein the one or more processors are configured to:
identify a set of modulation orders, based on a RRC configuration in the RRC message or a fixed set known to the UE, from at least one set of modulation orders; and
identify the modulation order, based on a value of the MCS field of the DCI, from the identified set of modulation orders,
wherein the at least one set of modulation orders comprises at least one of {Quadrature Phase Shift Keyed (QPSK), 16 Quadrature Amplitude Modulator (QAM) }, 16QAM, 64 QAM}, or {64QAM, 256 QAM} for a one bit MCS field.

23. A method of wireless communications for a base station, comprising:
transmitting a transport block size (TBS) in a radio resource control (RRC) message;
generating a modulation and coding scheme (MCS) without coding rates in an MCS field in response to transmitting the TBS, wherein the size of the MCS field is one bit; and
transmitting, to a user equipment (UE), downlink control information (DCI) having the MCS field, on a downlink channel, and with either an aggregation level (AL) of the DCI or a radio network temporary identifier (RNTI) associated with the DCI, wherein the UE identifies a modulation order using the MCS in the MCS field of the DCI and either the AL of the DCI or the RNTI associated with the DCI.

24. The method of claim 23 wherein the RRC message includes RRC configuration or RRC reconfiguration.

25. The method of claim 23, wherein the DCI is used for ultra-reliable and low latency communication (URLLC) factory automation (FA).

26. The method of claim 23, wherein the downlink channel is a physical downlink control channel (PDCCH).

27. A base station comprising:
a transceiver;
a memory configured to store instructions; and
one or more processors communicatively coupled with the transceiver and the memory, wherein the one or more processors are configured to:
  transmit a transport block size (TBS) in a radio resource control (RRC) message;
  generate a modulation and coding scheme (MCS) without coding rates in an MCS field in response to transmitting the TBS, wherein the size of the MCS field is one bit; and
  transmit, to a user equipment (UE), downlink control information (DCI) having the MCS field, on a downlink channel, and with either an aggregation level (AL) of the DCI or a radio network temporary identifier (RNTI) associated with the DCI,
wherein the UE identifies a modulation order using the MCS in the MCS field of the DCI and either the AL of the DCI or the RNTI associated with the DCI.

28. The base station of claim 27, wherein the RRC message includes RRC configuration or RRC reconfiguration.

29. The base station of claim 27, wherein the DCI is used for ultra-reliable and low latency communication (URLLC) factory automation (FA).

30. The base station of claim 27, wherein the downlink channel is a physical downlink control channel (PDCCH).

* * * * *